(12) United States Patent
Stephens et al.

(10) Patent No.: US 8,812,371 B1
(45) Date of Patent: Aug. 19, 2014

(54) USING FEEDBACK TO RECONCILE CATALOG ITEM ATTRIBUTES

(75) Inventors: Christopher A. Stephens, Issaquah, WA (US); Gregory N. Hullender, Seattle, WA (US); Erik W. Selberg, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/216,023

(22) Filed: Aug. 23, 2011

(51) Int. Cl.
*G06Q 30/00* (2012.01)
(52) U.S. Cl.
USPC ............... 705/26.35; 705/26.63; 705/27.1
(58) Field of Classification Search
USPC ................................. 705/26.1–27.2
See application file for complete search history.

(56) References Cited

U.S. PATENT DOCUMENTS

| | | | |
|---|---|---|---|
| 2008/0208713 A1* | 8/2008 | Vadlamani | 705/27 |
| 2008/0243631 A1* | 10/2008 | Kane et al. | 705/26 |
| 2009/0164338 A1* | 6/2009 | Rothman | 705/27 |
| 2012/0197758 A1* | 8/2012 | Zhong et al. | 705/26.35 |

OTHER PUBLICATIONS

Gordon, H. (2000). The annual best and worst of catalog copy. Catalog Age, 17(1), 63-64.*

* cited by examiner

*Primary Examiner* — Resha Desai
(74) *Attorney, Agent, or Firm* — Thomas Horstemeyer, LLP

(57) ABSTRACT

Disclosed are various embodiments for using contributor-provided attributes in conjunction with an electronic item catalog. A computer reconciles a plurality of attributes for an item in an electronic catalog using feedback data related to the item. Each of the attributes is provided by one of a plurality of merchants. The reconciled attribute of the item is updated in the electronic catalog.

20 Claims, 4 Drawing Sheets

USING FEEDBACK TO RECONCILE CATALOG ITEM ATTRIBUTES

BACKGROUND

An electronic commerce system operated by an online merchant allows users to purchase items online. The items are organized in a catalog. The user can search for items by attributes and can also view attributes of a particular item. Items in the catalog may be offered by multiple merchants. Each merchant provides a description of the products offered for sale. When multiple merchants are involved, discrepancies may exist between the product descriptions provided by different merchants.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to items in an electronic catalog, such as an electronic product catalog, and more specifically, to reconciling discrepancies or conflicts in item attributes. Merchants provide to the electronic commerce operator descriptions of the items they offer for sale, in the form of merchant contributions. With multiple merchants involved, discrepancies may arise between the item attributes in these descriptions.

Embodiments disclosed herein synthesize an authoritative attribute to show to users. When new contributions or changes to attributes in previously submitted contributions are received, the embodiments may use that information to improve the synthesized attribute. Doing so creates a risk that instead of improving the description, an attribute is synthesized in error, such that it no longer represents the same item. If that were to occur, a user who makes a purchase based on the new attribute will receive an item that is different from what the user actually ordered, since merchants submitted products based on the old description. Various embodiments disclosed herein choose an authoritative attribute that balances the benefit of improving the attribute and the risk of changing the item identity.

Embodiments described herein process the merchant contributions in order to determine an authoritative attribute. An attribute from a merchant contribution may be selected as the authoritative attribute, or an authoritative attribute may be synthesized from attributes in one or more merchant contributions. The process of creating an authoritative attribute incorporates feedback data which is affected by the accuracy of an item attribute, or which affects the accuracy of an item attribute. For example, the reconciling of conflicting attributes may incorporate item sales data as feedback, since customers may be expected to purchase an item with an accurate description more often than one with an inaccurate description. Once an authoritative attribute is determined, the catalog item is updated from the authoritative attribute.

Figure 1:
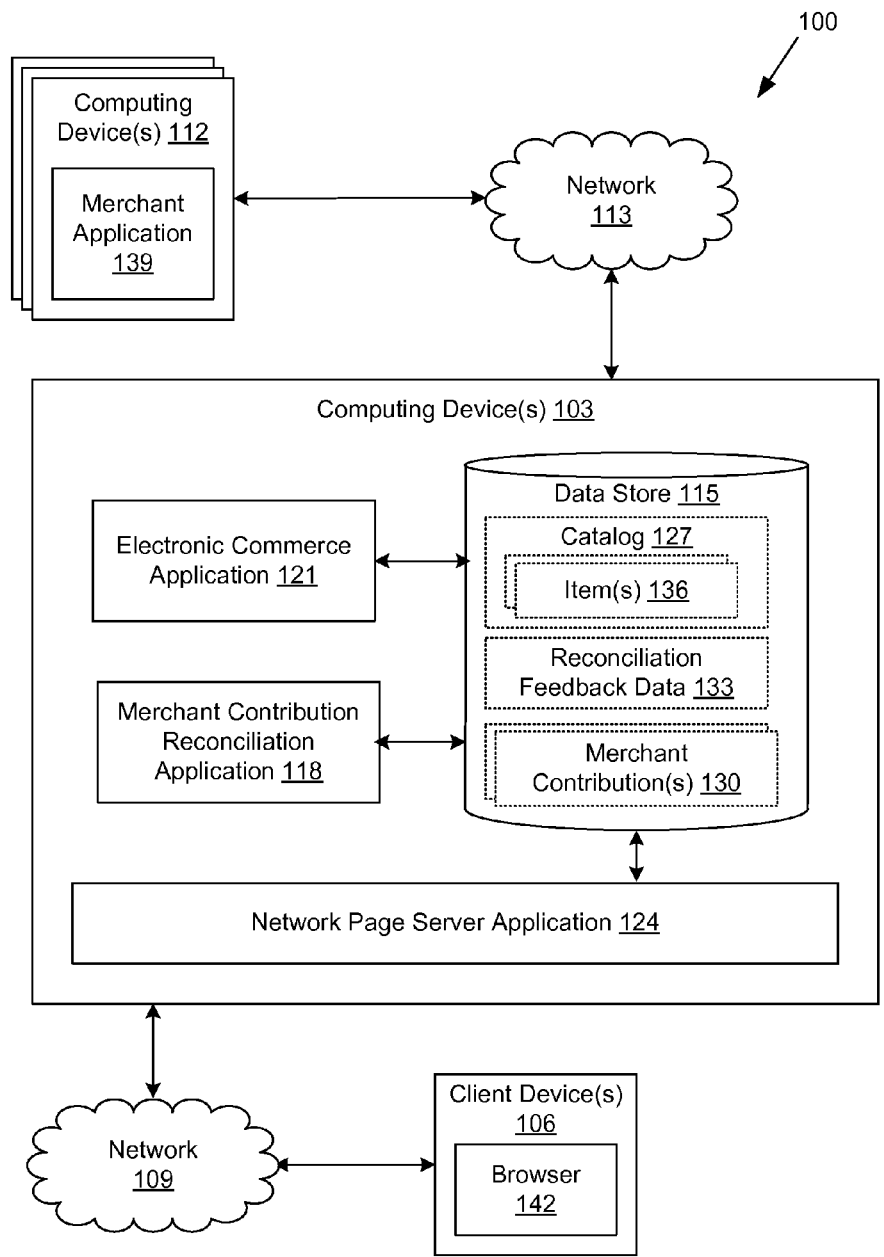
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network environment also includes one or more computing devices 112 in data communication with computing devices 103 by way of a network 113. Each of the networks 109, 113 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below.

The components executed on the computing device 103 include, for example, a merchant contribution reconciliation application 118, an electronic commerce application 121, and a network page server application 124. The components executed on the computing device 103 may also include other applications, services, processes, systems, engines, or functionality not discussed in detail herein. The data stored in the data store 115 includes data accessed by the components executing on the computing device 103, for example, an electronic catalog 127, one or more merchant contributions 130, and reconciliation feedback data 133, as well as potentially other data.

The electronic catalog 127 contains items 136, where each item 136 includes attributes, some or all of which may be searchable. In some embodiments, an attribute has a value and a name or other identifier. The attribute may also have a type (e.g., text, number, image, etc.). The electronic catalog 127 may comprise a product catalog of items offered for sale, so that items 136 comprise product data. The attributes for these items 136 may be provided by the operator of the electronic commerce application 121. Alternatively, merchants who sell items 136 through the electronic commerce application 121 may influence the attributes by providing merchant contributions 130, as described in more detail below. The reconciliation feedback data 133 is used to reconcile among multiple merchant contributions 130 when these contributions include conflicting attribute values, as described in more detail below.

The electronic commerce application 121 is executed in order to facilitate the online viewing and/or purchase of items and products in the electronic catalog 127 over the network 109. For example, the electronic commerce application 121 may provide content in response to user queries about items 136 in the electronic catalog 127. To this end, the network page server application 124 is executed to fetch network pages in response to requests from the client device 106. In some embodiments, the network page server application 124 is a web server which is executed to fetch web pages. The network pages fetched by the network page server application 124 may be dynamically generated or may be static. These network pages include various products from the electronic catalog 127. An application such as the electronic commerce application 121 may be executed to track user interaction with these network pages, thus building a history of products which a particular user has viewed, obtained through a search, selected, selected for purchase, purchased, selected for evaluation, and/or evaluated. The data derived from this user interaction may be stored as user behavior data (not shown).

The electronic commerce application 121 also performs various backend functions associated with the online presence of a merchant in order to facilitate the online purchase of items as should be appreciated. As one example, the electronic commerce application 121 may provide an interface through which merchants may create product listings, provide these product listings to the electronic commerce application 121, obtain sales and revenue data, etc.

The merchant contribution reconciliation application 118 is executed to reconcile conflicting merchant contributions 130. More specifically, the merchant contribution reconciliation application 118 is executed to generate authoritative contributions for items 136 in the electronic catalog 127 and to update items 136 in the electronic catalog 127 using these authoritative contributions. The merchant contribution reconciliation application 118 uses reconciliation feedback data 133 in reconciling among multiple merchant contributions 130 having the same attribute value. Incorporating item-specific data as feedback to the contribution process allows events and actions which are affected by the descriptive attributes of a catalog item to drive the determination of an appropriate attribute value.

The computing device 112 is representative of a plurality of computing devices that may be coupled to the network 113. The computing device 112 may comprise, for example, a processor-based system such as a computer system. Such a computer system may be embodied in the form of a desktop computer, a laptop computer, or other devices with like capability. The computing device 112 may be configured to execute a merchant application 139. The merchant application 139 may be executed in a computing device 112, for example, to allow a merchant to provide merchant contributions 130 for use in the electronic catalog 127. The merchant application 139 may also facilitate various other tasks performed by vendors, such as uploading inventory data, adding items to the catalog, etc. The merchant application 139 may be implemented as a standalone application executing on the computing device 112, or may execute in the context of a browser (not shown) executing on the computing device 112.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a browser 142 and other applications. The browser 142 may be executed in a client device 106, for example, to access and render network pages, such as web pages, or other network content served up by the network page server application 124. A customer or end user may interact with the browser 142, for example, to perform online shopping through the electronic commerce application 121. The client device 106 may be configured to execute applications beyond the browser 142 such as, for example, email applications, instant message applications, and/or other applications.

Figure 2:
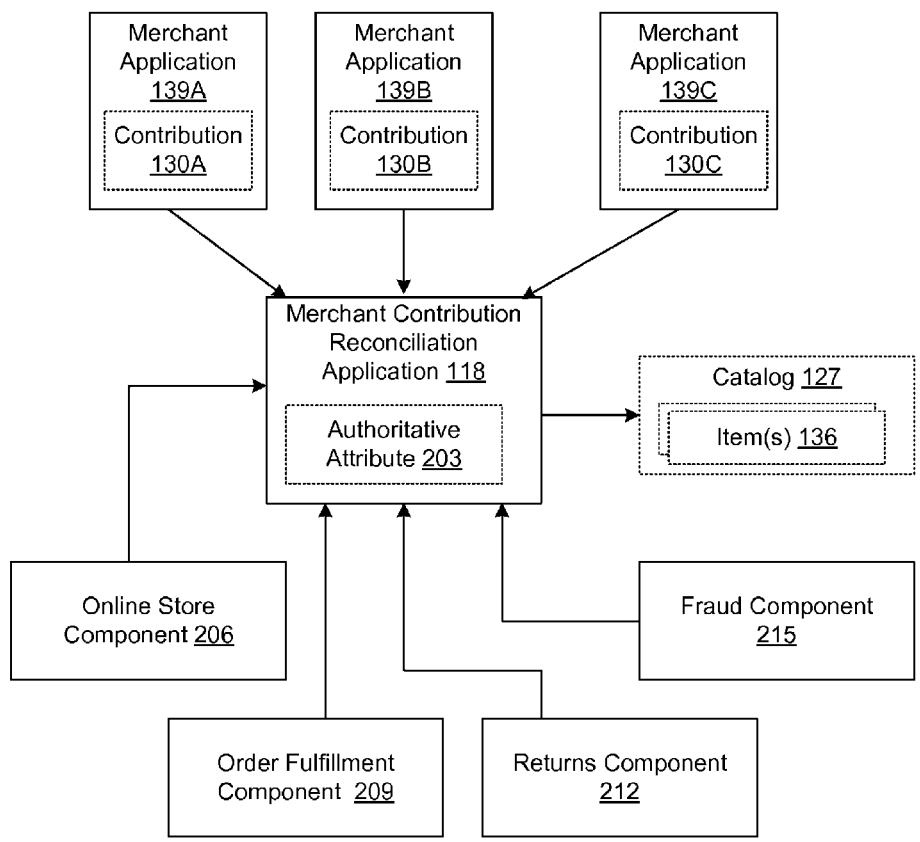
FIG. 2 is a diagram illustrating an example of operation of various components in the networked environment of FIG. 1 according to various embodiments of the present disclosure.

Turning to FIG. 2, a general description of the operation of the various components of the networked environment 100 (FIG. 1) is provided, according to various embodiments of the present disclosure. To begin, merchant applications 139A, 139B, 139C each provide respective merchant contributions 130A, 130B, 130C to the merchant contribution reconciliation application 118. Each merchant contribution 130A, 130B, 130C describes an aspect of a particular item 136 in the electronic catalog 127 (FIG. 1). Attributes may include, but are not limited to, title, manufacturer, size, color, weight, price, stock keeping unit (SKU), manufacturer part number, media type, etc. Attributes may vary widely depending on the type of item 136. For example, attributes such as director and year of release may be appropriate for a movie, while attributes such as memory capacity, battery life and physical dimensions may be appropriate for a consumer electronics item.

Since attributes for a particular item 136 may be received from more than one merchant, conflicts or discrepancies may arise. For example, merchant contribution 130A may specify the value of "Sony" for the Manufacturer attribute for a particular item 136 and merchant contribution 130B may specify the value of "Sony Corp." for the same attribute of the same item 136. As another example, merchant contribution 130B may specify the value "30 oz." as the value of the Weight attribute and merchant contribution 130C may specify "1 lb. 14 oz." as the value of the Weight attribute. The merchant contribution reconciliation application 118 reconciles attribute conflicts or discrepancies by creating an authoritative attribute 203. The authoritative attribute 203 may be created by selecting the attribute value from one merchant contribution 130 to be the authoritative attribute 203. The authoritative attribute 203 may also be created by computing a synthetic value based on a combination of merchant contributions. As just one example, the merchant contribution reconciliation application 118 may synthesize an authoritative attribute 203 which is the mean of the attribute values in the merchant contributions 130. The merchant contribution reconciliation application 118 then updates the item 136 in the electronic catalog 127 to include the authoritative attribute 203.

In making this selection, the merchant contribution reconciliation application 118 takes into account reconciliation feedback data 133 (FIG. 1) which either affects the accuracy of an item attribute, or is affected by the accuracy of an item attribute. When reconciling an attribute for an item, the merchant contribution reconciliation application 118 looks to data specific to that item (e.g., sales of that item, return rate for that item, etc.). For example, in one embodiment, the feedback data 133 is a combination of sales velocity for the item 136, a total sales volume for the item 136, a fraction of the sales volume for the item 136 that is attributable to a particular one of the plurality of merchants, and a return frequency for the item.

Various non-limiting examples of reconciliation feedback data 133 will now be discussed. As one example, tracking data which describes which items 136 are viewed, selected for purchase, and/or purchased by a customer may be used as reconciliation feedback data 133 because customers presumably prefer interacting with products that have accurate descriptions over ones that have inaccurate descriptions. The reconciliation feedback data 133 may also be data which describes the reliability of a particular merchant in providing contributions. In this manner, merchants that provide reliable contributions are preferred over merchants that provide less reliable contributions, which gives merchants an incentive to provide accurate attribute information. As yet another example, data which describes the importance of the particular item to a merchant can be used as reconciliation feedback data 133. For example, an expectation-maximization technique could be used, where the hidden variable is the merchant reliability score. Other techniques can be used as well, as should be appreciated. In this manner, merchants that have a relatively large stake in providing good attribute information (e.g., high sales for the item) are preferred over merchants that have a relatively small stake. Tying the reconciliation process to an attribute's importance ensures that merchants who are affected most have a strong incentive to provide accurate attribute information.

The reconciliation feedback data 133 may be provided by one or more components that make up, or interact with, the electronic commerce application 121. For example, the reconciliation feedback data 133 may be provided by an online storefront component 206 with which a customer interacts to view and/or purchase items 136. As another example, the reconciliation feedback data 133 may be provided by an order fulfillment component 209 that fulfills customer orders and arranges for delivery of items 136 to customers. As yet another example, the reconciliation feedback data 133 may be provided by a returns component 212 with which a customer interacts to return purchased items 136. As still another example, the reconciliation feedback data 133 may be provided by a fraud component 215 that detects, tracks, or investigates suspected fraud on the part of merchants or customers.

In some embodiments, the particular type of data used for the reconciliation feedback data 133 is empirically determined by maintaining multiple electronic catalogs 127 and tracking customer behavior to compare the accuracy or effectiveness of one merchant contribution 130 against another. For example, a first set of customers may interact with a first electronic catalog 127 and a second set of customers may interact with a second electronic catalog 127, where the catalogs are the same except that the item attributes are derived from different merchant contributions 130. If more customers purchase a particular item 136 from the first electronic catalog 127, this is some indication that the attributes in the first set of merchant contributions 130 are more accurate than the attributes in the second set of merchant contributions 130. Such use of customer behavior directly affects the estimate of the accuracy of these attributes and indirectly affects the values of all other attributes ever supplied by these merchants.

Figure 3:
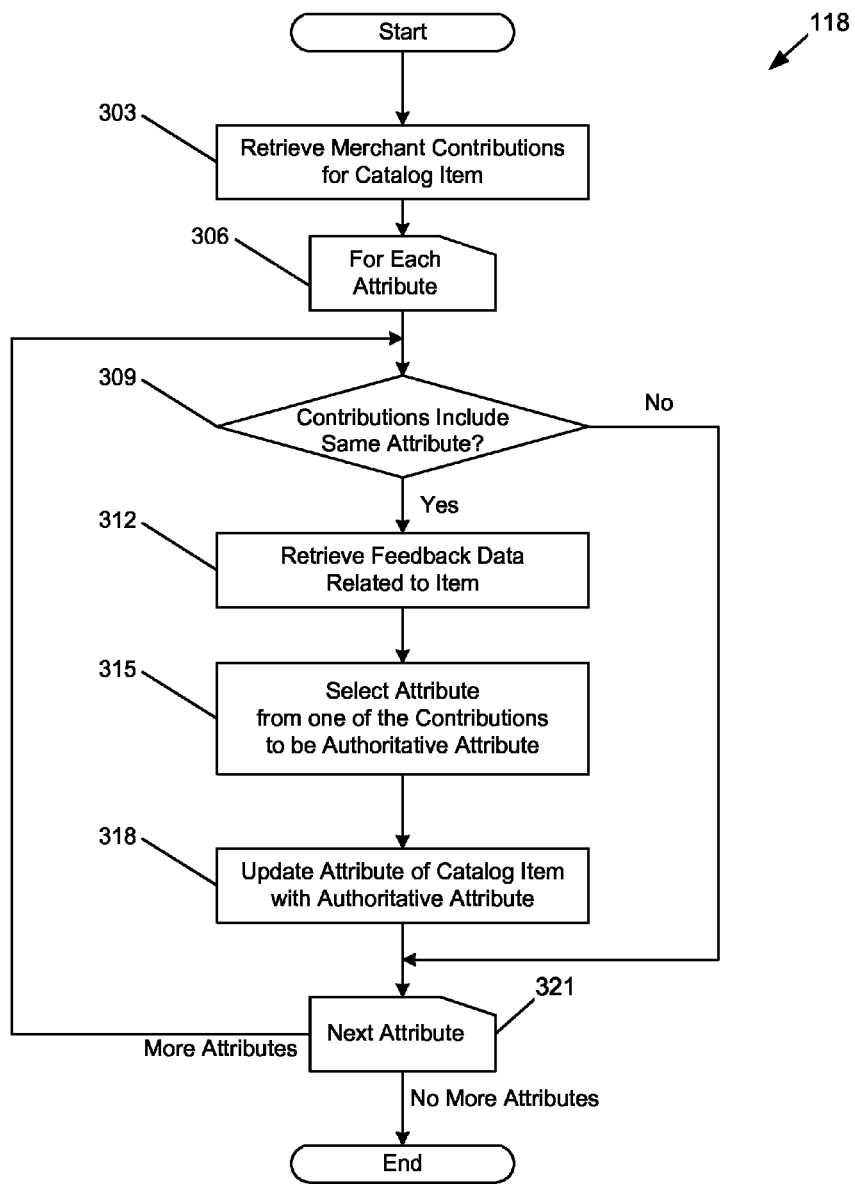
FIG. 3 is a flowchart illustrating an example of functionality implemented as portions of a merchant contribution reconciliation application executed in a computing device in the networked environment of FIG. 1 according to various embodiments of the present disclosure.

Turning now to FIG. 3, shown is a flowchart that provides one example of the operation of a portion of the merchant contribution reconciliation application 118 (FIG. 1) according to various embodiments. It is understood that the flowchart of FIG. 3 provides merely an example of the many different types of functional arrangements that may be employed to implement the operation of the portion of the merchant contribution reconciliation application 118 as described herein. As an alternative, the flowchart of FIG. 3 may be viewed as depicting an example of steps of a method implemented in the computing device 103 (FIG. 1) according to one or more embodiments.

Beginning at box 303, the merchant contribution reconciliation application 118 retrieves, from the data store 115 (FIG. 1), the merchant contributions 130 (FIG. 1) provided by different merchants for a particular item 136 (FIG. 1) in the electronic catalog 127 (FIG. 1). Next, at box 306, the merchant contribution reconciliation application 118 begins a loop which iterates through the attributes contained in the merchant contributions 130 for the particular item 136. Each iteration operates on a current attribute and the loop exits when all attributes of the item 136 have been processed. The iteration loop begins with a first attribute, but no particular order is implied or required.

At box 309, the merchant contribution reconciliation application 118 examines the merchant contributions 130 to determine whether the merchant contributions 130 include different values for the current attribute. If at box 309 it is determined that there are no discrepancies in the values provided by different merchants for the same attribute, then no reconciliation of attributes is needed, and the merchant contribution reconciliation application 118 moves to box 321 and moves to the next attribute. However, if at box 309 it is determined that the merchant contributions 130 include different values for the current attribute, then the merchant contributions 130 moves to box 312.

At box 312, the merchant contribution reconciliation application 118 retrieves, from the data store 115, reconciliation feedback data 133 (FIG. 1) that is specific to the particular item 136 being handled. Next, at box 315, the merchant contribution reconciliation application 118 reconciles the different attribute values by determining an authoritative attribute for the item 136. The determination of an authoritative attribute is based on the reconciliation feedback data 133 retrieved at box 312. As described above, the authoritative attribute may be one selected from an existing merchant contribution, or may be computed or synthesized from multiple merchant contributions. Having determined an authoritative attribute for the item 136, at box 318 the merchant contribution reconciliation application 118 updates the item 136 in the electronic catalog 127 with the authoritative attribute chosen at box 315 by replacing the existing value for the item attribute with the value from the authoritative attribute. In another embodiment, multiple attributes are reconciled before the item 136 is updated in the electronic catalog 127. After updating the electronic catalog 127 at box 318, the merchant contribution reconciliation application 118 moves to box 321 and moves to the next attribute. When all attributes have been handled, the process of FIG. 3 is complete.

The reconciliation process of determining an authoritative attribute 203 may be implemented using various machine learning techniques, as should be appreciated. A non-limiting list of example machine learning algorithms includes neural networks, classifiers, support vector machines, and expectation-maximization, but others may be used as should be appreciated.

In some embodiments, the reconciliation process of FIG. 3 is triggered automatically when a merchant contribution 130 is added to the data store 115. In other embodiments, the reconciliation process of FIG. 3 is triggered automatically when a merchant contribution 130 having an attribute value different than that provided by the other merchants is added to the data store 115. In still other embodiments, the reconciliation process of FIG. 3 executes periodically to check for differences in attribute values.

In FIG. 3, the reconciliation process is unconditional, such that the merchant contribution reconciliation application 118 always selects an authoritative item when a conflict is detected. In other embodiments, the merchant contribution reconciliation application 118 may receive a conflicting merchant contribution 130 but choose not to reconcile the attribute, since it may be undesirable to have a large number of changes to the electronic catalog 127, or frequent changes to the electronic catalog 127. It may also be acceptable to customers to have frequent changes to some items 136 but not to others. Therefore, the merchant contribution reconciliation application 118 may, in some embodiments, make execution of the reconciliation process conditional on various criteria. For example, the decision to reconcile may be based on the age of the item 136, the number of merchants that list the item 136, the number of merchants that have sales of the item 136, the volume of sales for the item 136, or other suitable criteria which act as a proxy for how much impact the reconciliation will have on catalog sales.

Another type of criteria that may be used in deciding to reconcile involves the magnitude of the change. Changes to some attributes may be considered more significant than changes to other attributes. For example, the merchant contribution reconciliation application 118 may choose not to perform reconciliation in order to make a change in the item title, while making a change to the item color may be acceptable. As another example, the merchant contribution reconciliation application 118 may choose to reconcile an item title from "Play Station" to "PlayStation" but choose not to reconcile an item title from "Play Station" to "Gameboy" because customers might find such a large change unsettling. Conversely, the merchant contribution reconciliation application 118 may decide that a change to the item title should always be reconciled, because the title is an attribute which many customers depend on in making purchasing decisions.

In some embodiments, the decision to perform reconciliation or not is empirically determined by maintaining multiple electronic catalogs 127 and tracking customer behavior to compare the impact of a particular type of change. For example, a first set of customers may interact with a first electronic catalog 127 which includes the reconciled attribute and a second set of customers may interact with a second electronic catalog 127 which does not. If more customers purchase a particular item 136 from the first electronic catalog 127 than from the second electronic catalog 127, this is some indication that the reconciled attribute has impacted customers in a positive way as compared to the unreconciled attribute. The merchant contribution reconciliation application 118 may react to this positive impact by applying the reconciliation to the master catalog. Conversely, if the customer behavior indicates that the reconciled attribute has impacted customers in a negative way, the merchant contribution reconciliation application 118 may leave the master catalog in an unreconciled state with respect to the tested attribute. In the case of negative impact, the merchant contribution reconciliation application 118 may permanently remove the reconciled version of the tested attribute from the merchant contribution 130.

Some embodiments include the concept of hardening, in which the decision of whether or not to reconcile is based on the existing attribute value. In such embodiments, when enough feedback data 133 has been gathered to produce a threshold confidence level, the attribute is not further reconciled, but is instead left with its current value. For example, the reconciliation algorithm behaves such that the more sales an item has, the more likely it is that the reconciliation algorithm will leave the existing value in place rather than choosing an attribute from a new contribution. This hardening can be integrated into the process described in connection with FIG. 3 so that the existing value is taken into account when choosing an authoritative attribute. This hardening can also be done as a separate pass, where an authoritative attribute is chosen but a separate decision is made as to whether or not to use this authoritative attribute, or to discard it.

Figure 4:
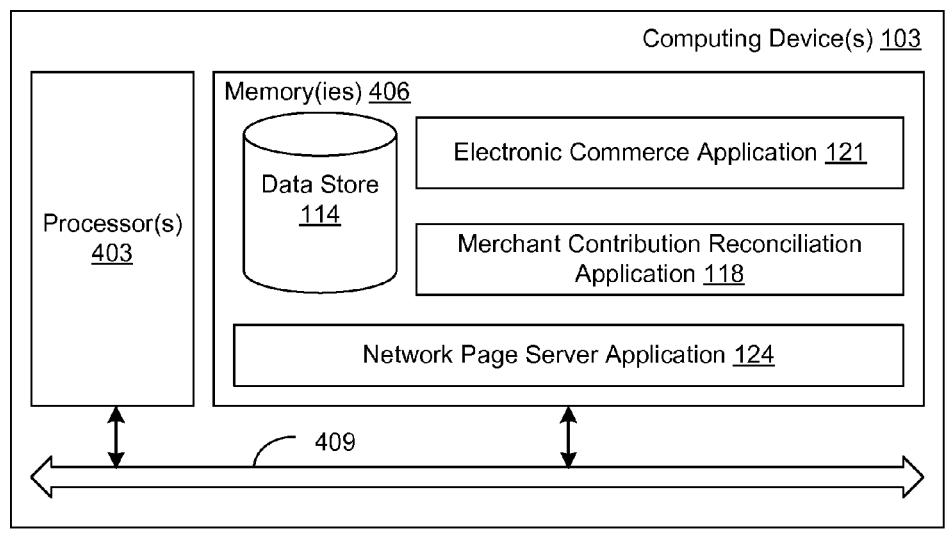
FIG. 4 is a schematic block diagram that provides one example illustration of a computing device employed in the networked environment of FIG. 1 according to various embodiments of the present disclosure.

Moving on to FIG. 4, shown is a schematic block diagram of the computing device 103 (FIG. 1) according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the merchant contribution reconciliation application 118, the electronic commerce application 121, the network page server application 124, and potentially other applications. Also stored in the memory 406 may be a data store 115 and other data. In addition, an operating system may be stored in the memory 406 and executable by the processor 403. While not illustrated, the client device 106 also includes components like those shown in FIG. 4, whereby merchant contribution reconciliation application 118 is stored in a memory and executable by a processor.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors and the memory 406 may represent multiple memories that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the merchant contribution reconciliation application 118, the electronic commerce application 121, the network page server application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the merchant contribution reconciliation application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in flowchart of FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the merchant contribution reconciliation application 118, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   an application implemented in the at least one computing device, the application comprising:
      logic that sets an authoritative attribute for an item in an electronic catalog, wherein the authoritative attribute is based at least in part on a plurality of contributions from a plurality of users;
      logic that tracks a number of views and a number of purchases of the item from individual ones of the plurality of users to determine an accuracy of the authoritative attribute value; and
      logic that updates a description of the item in the electronic catalog to include the authoritative attribute.

2. The system of claim 1, wherein the number of views and the number of purchases reflect at least one of a sales velocity for the item, a total sales volume for the item, and a fraction of the total sales volume attributable to a particular one of the users.

3. The system of claim 1, wherein the number of views and the number of purchases reflect a combination of a sales velocity for the item, a total sales volume for the item, and a fraction of the total sales volume attributable to a particular one of the plurality of users.

4. The system of claim 1, wherein the number of views and the number of purchases reflect an importance of the item to the plurality of users.

5. The system of claim 1, wherein the number of views and the number of purchases reflect an accuracy of the plurality of contributions.

6. The system of claim 1, wherein the number of views and the number of purchases reflect feedback indicating an error in one of the plurality of contributions.

7. The system of claim 1, wherein the number of views and the number of purchases reflect a score that describes a reliability of a user providing contributions.

8. A method comprising:
   obtaining, via at least one of one or more computing devices, a plurality of contributions for an attribute of an item in a first electronic catalog;
   setting, via at least one of one or more computing devices, an authoritative attribute value based on the plurality of contributions;
   obtaining, via at least one of one or more computing devices, reconciliation feedback data corresponding to the plurality of contributions;
   weighting, via at least one of one or more computing devices, individual ones of the plurality of contributions according to the reconciliation feedback data;
   tracking, via at least one of one or more computing devices, an interaction of a first set of users with the first electronic catalog;
   tracking, via at least one of one or more computing devices, an interaction of a second set of users with a second electronic catalog;
   determining, via at least one of one or more computing devices, an accuracy of the attribute of the item as a result of tracking the interaction of the first set of users and the interaction of the second set of users, wherein the first and second electronic catalogs include the attribute of the item from different providers of the item; and
   updating, via at least one of one or more computing devices, the attribute of the item to embody the authoritative attribute value.

9. The method of claim 8, wherein the plurality of contributions are obtained from a plurality of providers.

10. The method of claim 8, wherein the authoritative attribute value is a mean value of the plurality of contributions.

11. The method of claim 8, further comprising tracking feedback data to determine an accuracy of the authoritative attribute value.

12. The method of claim 11, further comprising updating the attribute of the item based upon the feedback data.

13. A non-transitory computer readable medium comprising a program executable on a computing device, wherein the program comprises:
   code that obtains a plurality of contributions for an attribute of an item offered for sale in an electronic catalog by a plurality of users, wherein the plurality of contributions are received from the plurality of users;
   code that sets an authoritative attribute value based on the plurality of contributions;
   code that tracks a number of views and a number of purchases of the item from individual ones of the plurality of users to determine an accuracy of the authoritative attribute value; and
   code that updates the attribute of the item to reflect the authoritative attribute value.

14. The non-transitory computer readable medium of claim 13, further comprising code that tracks feedback data to determine the accuracy of the authoritative attribute value.

15. The non-transitory computer readable medium of claim 14, wherein the feedback data comprises at least one of a sales velocity for the item, a total sales volume for the item, or a fraction of the sales volume attributable to a particular one of the plurality of users.

16. The non-transitory computer readable medium of claim 14, wherein the feedback data comprises a combination of a sales velocity for the item, a total sales volume for the item, and a fraction of the sales volume attributable to a particular one of the plurality of users.

17. The non-transitory computer readable medium of claim 14, wherein the feedback data describes an importance of the item to the plurality of users.

18. The non-transitory computer readable medium of claim 14, wherein the feedback data describes an accuracy of the plurality of contributions.

19. The non-transitory computer-readable medium of claim 14, wherein the feedback data comprises feedback indicating an error in one of the plurality of contributions.

20. The non-transitory computer-readable medium of claim 14, wherein the feedback data comprises a score that describes a reliability of a user providing contributions.

* * * * *